United States Patent
Lin et al.

(10) Patent No.: US 7,457,904 B2
(45) Date of Patent: Nov. 25, 2008

(54) METHODS AND SYSTEMS FOR A REFERENCE CLOCK

(75) Inventors: Richard S. Lin, Houston, TX (US);
Jeffrey K. Jeansonne, Houston, TX (US); Walter G. Fry, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 211 days.

(21) Appl. No.: 11/014,409

(22) Filed: Dec. 16, 2004

(65) Prior Publication Data

US 2006/0136643 A1 Jun. 22, 2006

(51) Int. Cl.
*G06F 13/00* (2006.01)
*G06F 13/36* (2006.01)
*G06F 3/00* (2006.01)
*G06F 13/38* (2006.01)
*G06F 1/12* (2006.01)
*G06F 1/04* (2006.01)

(52) U.S. Cl. ............ 710/302; 710/36; 710/66; 710/306; 713/400; 713/600; 327/291

(58) Field of Classification Search .......... 710/302, 710/306, 66, 36; 713/400, 600; 327/291
See application file for complete search history.

(56) References Cited

U.S. PATENT DOCUMENTS

| | | | |
|---|---|---|---|
| 5,051,606 A | 9/1991 | Ikehara | |
| 6,546,496 B1 | 4/2003 | Wang et al. | |
| 6,874,042 B2 * | 3/2005 | Sauber | 710/38 |
| 6,940,937 B2 * | 9/2005 | Xiu et al. | 375/376 |
| 6,944,738 B2 * | 9/2005 | Dong | 711/167 |
| 6,990,162 B2 * | 1/2006 | Vu | 375/357 |
| 7,098,685 B1 * | 8/2006 | Agrawal et al. | 326/38 |
| 2002/0174375 A1 | 11/2002 | Oh | |
| 2004/0088466 A1 | 5/2004 | Tang et al. | |
| 2005/0251609 A1 * | 11/2005 | Chou et al. | 710/313 |
| 2006/0123177 A1 * | 6/2006 | Chan et al. | 710/306 |

OTHER PUBLICATIONS

PCMCIA, The ExpressCard Standard—The Next Generation PC Card Technology, Oct. 2003, PCMCIA.*
David Arciniega, Using the TPS2231 ExpressCard Power Switch Controller, Aug. 2004, Texas Instrument.*
Intel, PCI Express Architecture Initiative Overview, Oct. 2003, Intel.*
Ken Stufflebeam, Brad Saunders, How to Implement ExpressCard Solutions on Mobile Platforms, Jan. 2005, Microsoft.*
Rick Merritt, NEC, TI unveil PCI Express chips as systems issues emerge, Sep. 15, 2003, EE Times.*

(Continued)

*Primary Examiner*—Khanh Dang
*Assistant Examiner*—Christopher A Daley (57) ABSTRACT

In at least some embodiments, a method comprises receiving an external card detection signal that indicates that a hot-pluggable card is coupled to a computer system and activating at least one reference clock signal of a scalable reference clock platform based on the external card detection signal. The method further comprises synchronizing clock signals embedded in data packets transmitted between the hot-pluggable card and the computer system with another clock signal bases on the at least one reference clock signal.

25 Claims, 6 Drawing Sheets

OTHER PUBLICATIONS

Tammy Lee, PCI Express Design Enablement Efforts Accelerate Initial Product Testing in Early 2003, 2002,Lee Communications.*
David Arciniega, Using the TPS2231 Expresscard Poer Switch/Controller, Aug. 2004.*
The Expresscard Standard, The next generation PC card technology, Oct. 2003.*
Office Action dated Mar. 14, 2008, Chinese Patent App. No. 200510022999.0, filed Dec. 15, 2005, 12 pp.

* cited by examiner

FIGURE 6 large table removed for brevity

METHODS AND SYSTEMS FOR A REFERENCE CLOCK

BACKGROUND

In some computers, additional functionality may be added via swappable (i.e., hot-pluggable) plug-in devices known as "cards" or "modules." When a card is plugged into an associated port or slot of a computer, the functionality of the card is accessible to the computer. If a user wishes, the card may be unplugged from one computer and plugged into another computer, thereby switching the functionality provided by the card from one computer to another.

In order for some cards to function, a computer that receives the card may need to periodically synchronize clock signals embedded in data packets with another clock signal. This periodic syncing may be performed by a reference clock. Unfortunately, permitting a reference clock to run continuously (whether or not a card is plugged in) results in increased power consumption and increased likelihood of electromagnetic interference (EMI). Further, altering an existing reference clock architecture (i.e., platform) is often costly and may cause compatibility problems.

BRIEF DESCRIPTION OF THE DRAWINGS

For a detailed description of exemplary embodiments of the invention, reference will now be made to the accompanying drawings in which.

NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more parts and may be used to refer to a computer system or a portion of a computer system.

DETAILED DESCRIPTION

As disclosed herein, some embodiments of the invention enable a serial reference clock signal to be activated/deactivated based on the presence or the absence of a hot-pluggable card. When activated, a serial reference clock enables periodic synchronizing of clock signals embedded in data packets with another clock signal. For example, devices that implement a Peripheral Component Interconnect Express protocol ("PCI Express") use a serial reference clock to periodically sync clock signals embedded in data packets with a 2.5 GHz clock signal.

In some embodiments, activation/deactivation of a serial reference clock based on the presence or absence of a hot-pluggable card is accomplished by reducing a predetermined scalability of the serial reference clock platform. As used herein, reducing the predetermined scalability of a serial reference clock platform comprises reducing the availability or quality of at least one serial reference clock signal associated with a scalable serial reference clock platform. For example, the serial reference clock platform for PCI Express is predetermined to be scalable up to a maximum of seven pairs of differential serial reference clock signals. Thus, in embodiments that implement PCI Express, reducing the predetermined scalability of a serial reference clock platform comprises reducing the availability or quality of at least one of the seven pairs of differential serial reference clock signals.

Reducing the predetermined scalability of a serial reference clock platform enables an external card signal (indicating the presence or absence of a hot-pluggable card) to be received by a serial reference clock directly. For example, a serial reference clock may be configured to receive the external card signal via a pin location that is available by reducing the predetermined scalability of the serial reference clock platform. In some embodiments, reducing the predetermined scalability of a serial reference clock platform does not affect a system's performance. For example, some systems that implement PCI Express may only use, for example, two pairs or three pairs (out of seven pairs) of the differential serial reference clocks. In such systems, reducing the predetermined scalability of PCI Express from seven pairs of differential serial reference clocks to, for example, six pairs of differential serial reference clocks does not affect the system's performance.

In alternative embodiments, activation/deactivation of a serial reference clock based on the presence or absence of a hot-pluggable card is accomplished by an interrupt routine compatible with existing hardware components of a system that implements the serial reference clock generator. For example, a hardware component (e.g., a chipset) having programmable inputs may be configured to receive a signal that indicates when a card is present (i.e., plugged into a system). When the programmable input indicates that the signal has been received, an interrupt routine compatible with the hardware component may be executed whereby one or more commands are sent to the serial reference clock generator to activate a reference clock.

In some cases, existing system architectures are predetermined or predefined such that hardware changes/additions potentially create compatibility problems and other issues. Embodiments of the invention described herein, provide the benefit of limiting or eliminating hardware changes/additions to existing system architectures, thus, reducing compatibility problems and expenses related to such hardware changes/additions.

Figure 1:
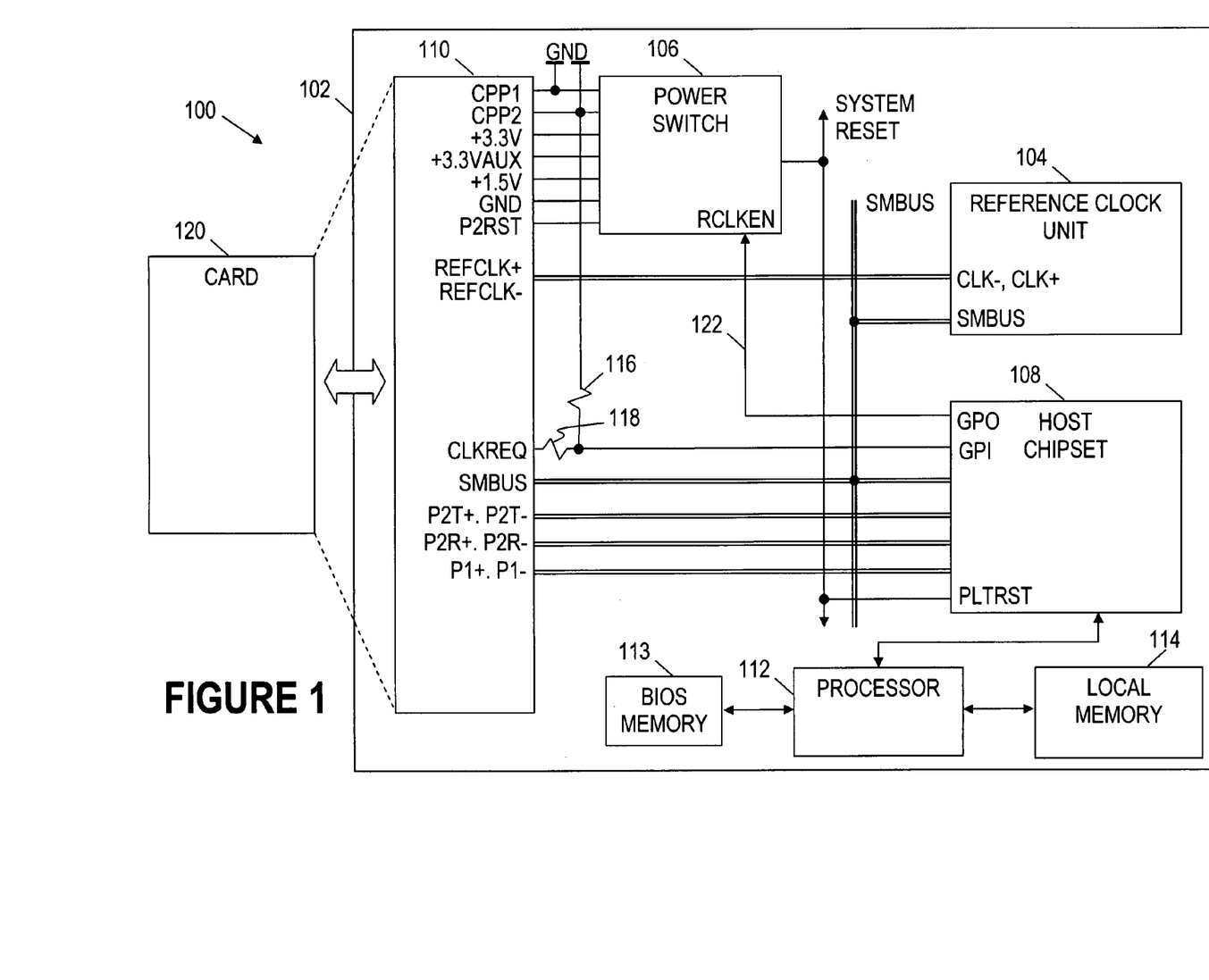
FIG. 1 illustrates a system in accordance with embodiments of the invention.

FIG. 1 illustrates a system 100 in accordance with embodiments of the invention. As shown in FIG. 1, the system 100 comprises a computer 102 having a processor 112 coupled to a host chipset 108. The host chipset 108 provides an interface between the processor 112 and a port 110 as well as other components of the system 100. The processor 112 may execute computer-readable instructions, an operating system and other applications stored in a local memory 114, BIOS (Basic Input/Output System) memory 113, or other storage mediums coupled to the processor 112. The computer 102 also comprises a reference clock unit 104 coupled to the host chipset 108 and configured to receive commands (e.g., write commands) from the host chipset 108. As shown, a power switch 106, the reference clock unit 104, and the host chipset 108 couple to the port 110 which is configured to receive a hot-pluggable card 120.

The hot-pluggable card 120 adds a predetermined functionality to the computer 102. For example, the hot-pluggable card 120 may provide networking functionality, graphics functionality, audio functionality, peripheral bus functionality, memory or other functionality. In some embodiments, the hot-pluggable card 120 implements the PCI Express protocol and the port 110 may be a corresponding PCI Express-compatible port. Alternatively, the hot-pluggable card 120 and the port 110 may implement another communication protocol, now known or later developed.

As shown, the port 110 transmits several signals between components of the computer (e.g., the reference clock unit 104, the power switch 106, and the host chipset 108) and the hot-pluggable card 120. Table 1 shows a listing of signal labels used in FIG. 1 as well as extended signal names and a description of signal use.

TABLE 1

| Signal Label | Signal Name | Signal Use |
|---|---|---|
| CPP1 | Card Present Protocol 1 | Signals when a first protocol (e.g., USB) card is present |
| CPP2 | Card Present Protocol 2 | Signals when a second protocol (e.g., PCI Express) card is present |
| +3.3 V | Power supply 1 | Provides a 3.3 volt signal to the card |
| +3.3 VAUX | Auxiliary Power Supply | Provides a 3.3 volt auxiliary signal to the card |
| +1.5 V | Power Supply 2 | Provides a 1.5 volt signal to the card |
| GND | Ground | Provides an electrical ground to components |
| P2RST | Protocol 2 Reset | Provides a logic level "reset" signal |
| REFCLK+, REFCLK− | Reference Clock | Provides a positive and negative clock reference to the card |
| CLKREQ | Clock Request | Signals that the card requires a clock reference |
| SMBUS | System Management Bus | Provides System Management protocol signals to the clock |
| P2T+, P2T− | Protocol 2 Differential Transmit Pair | Provides a serial bus connection to the card |
| P2R+, P2R− | Protocol 2 Differential Receive Pair | Provides a serial bus connection to the card |
| P1+, P1− | Protocol 1 Port Differential Pair | Protocol 1 connection to the card |
| PLTRST | Platform Reset | Controls reset to card |

As shown in Table 1, the CPP1 signal indicates when a hot-pluggable card 120 based on a first protocol (e.g., Universal Serial Bus or "USB") is plugged into the port 110. The CPP2 signal indicates when a hot-pluggable card 120 based on a second protocol (e.g., PCI Express) is plugged into the port 110. The +3.3V signal supplies a 3.3 volt signal to the hot-pluggable card 120. The +3.3 VAUX signal supplies an auxiliary 3.3 volt signal to the hot-pluggable card. The +1.5V signal supplies a 1.5 volt signal to the hot-pluggable card 120. The GND signal represents an electrical ground for components of the system 100 and the hot-pluggable card 120.

The P2RST signal indicates when to reset a hot-pluggable card 120 based on the second protocol. For example, the P2RST signal may be asserted after valid power and reference clock signals are provided to the hot-pluggable card 120. The REFCLK+ and REFCLK− signals supply a positive clock reference and a negative clock reference respectively to the hot-pluggable card 120. The REFCLK+ and REFCLK− signals may be output from high resistance (Hi-Z) clock generator outputs. As described previously, the REFCLK+ and REFCLK− signals may be used to synchronize clock signals embedded in data packets transferred between the card 120 and the computer 102 with another clock signal.

The CLKREQ signal indicates when the hot-pluggable card 120 requests a serial reference clock signal. The SMBUS signal supplies SMBUS protocol commands between the host chipset 108 and the clock unit 104. The P2T signals provide serial bus signals from the host chipset 108 to a hot-pluggable card 120 based on the second protocol. The P2R signals provide serial bus signals from the hot-pluggable card 120 to the host chipset 108 based on the second protocol. In some embodiments, the P2T and P2R signals correspond to the data packets with embedded clock signals described previously. Thus, the REFCLK+ and REFCLK− signals may be used to sync embedded clock signals associated with the P2T and P2R signals with another clock (e.g., a 2.5 GHz clock).

The P1 signals provide signals between the host chipset 108 and the hot-pluggable card 120 based on the first protocol. The PLTRST signal enables the chipset 108 to reset devices on the platform (e.g., a PCI Express platform). As shown, the PLTRST signal is input to the power switch 106 which, in some embodiments, controls the P2RST signal as will later be described. While the signals described above are used in the exemplary embodiment of FIG. 1, embodiments of the invention are not limited to these signals and may implement other signals.

When the computer 102 is powered up (e.g., during a power-on self-test referred to as a "POST"), a general programmable input (GPI) of the chipset 108 is configured for use with the CPP2 signal. For example, a system management interrupt (SMI) handler or an Advanced Configuration and Power Interface (ACPI) method may be executed by the processor 112 to program the GPI to generate interrupts compatible with the chipset 108 based on the CPP2 signal. In some embodiments, the SMI handler or the ACPI method described above may use Basic Input/Output System (BIOS) code. The BIOS code may be stored in the BIOS memory 113 coupled to the processor 112.

If the GPI cannot trigger on both input signal edges (rising edge and falling edge), the BIOS code (or other computer-readable instructions), when executed, causes the processor 112 to detect the state of the CPP2 signal to set up the signal edge to trigger an interrupt. As shown in FIG. 1, either the CPP2 signal or the CLKREQ signal may be input to the GPI of the host chipset 108. Therefore, one of the low resistance jumpers 116, 118 may be used. If the low resistance jumper 116 is present, the assertion and de-assertion of the CPP2 signal is detectable by the host chipset 108. Alternatively, if the low resistance jumper 118 is present, the assertion and de-assertion of the CLKREQ signal is detectable by the host chipset 108.

If either the CPP2 signal or the CLKREQ signal is detected to be asserted, the BIOS code causes a general programmable output (GPO) of the chipset 108 to de-assert a signal 122 to an RCLKEN (release clock enable) input of the power switch 106. De-assertion of the RCLKEN signal causes the card 120 (via the P2RST signal) to remain in a reset state.

As shown in FIG. 1, the CPP2 signal is also input to the power switch 106. Detection of an asserted CPP2 signal by the power switch 106 causes power to be released to the card 120. However, the card 120 is not released from the reset state until the REFCLK signals have been activated and stabilized.

In response to receiving an asserted CPP2 signal or an asserted CLKREQ signal by the GPI of the host chipset 108, an interrupt routine is executed. During the interrupt routine, the host chipset 108 asserts a signal to the reference clock unit 104 whereby the reference clock unit 104 outputs the REFCLK+ and REFCLK− signals. For example, FIG. 1 shows that a System Management Bus (SMBUS) couples the host chipset 108 to the reference clock unit 104 whereby the host chipset 108 and the reference clock unit 104 communicate using an SMBUS protocol. In such embodiments, the host chipset 108 may implement a SMBUS write command to activate the reference clock unit 104 to output the REFCLK+ and REFCLK− signals to the hot-pluggable card 120.

Initially, the REFCLK+ and REFCLK− signals may be unstable. Therefore, a time period hereafter referred to as a "settling period" may be implemented to allow the REFCLK+ and REFCLK− signals to stabilize. The settling period may be a predetermined time period. Alternatively, the settling period may be determined by monitoring the REFCLK+ and REFCLK− signals to determine when the signals have stabilized. After the settling period, the host chipset 108 asserts the RCLKEN signal 122 to the power switch 106. Assertion of the RCLKEN signal 122 causes the power switch 106 to release the P2RST (reset) signal to the hot-pluggable card 120 thereby enabling the card 120 to operate.

Before the interrupt routine terminates, the GPI of the host chipset 108 is set up to trigger an interrupt in response to a rising edge of the CPP2 signal or the CLKREQ signal (i.e., in some embodiments, a rising edge is associated with a de-asserted CPP2 signal or CLKREQ signal because a "high" signal rather than a "low" signal indicates absence of the card 120). If the GPI later detects a de-asserted CPP2 signal or CLKREQ signal, the SMI handler or the ACPI code causes a SMBUS write command to be sent to the reference clock unit 104. The write command disables the REFCLK signals to the card 120. The SMI handler or the ACPI code also causes the GPO of the host chipset 108 to de-assert the RCLKEN signal to the power switch 106 thereby setting up the P2RST signal in the correct state for when the a card 120 is inserted into the port 110. Also, the GPI of the host chipset 108 is again set up to trigger in response to a falling edge (i.e., assertion) of the CPP2 signal or the CLKREQ signal.

Figure 2:
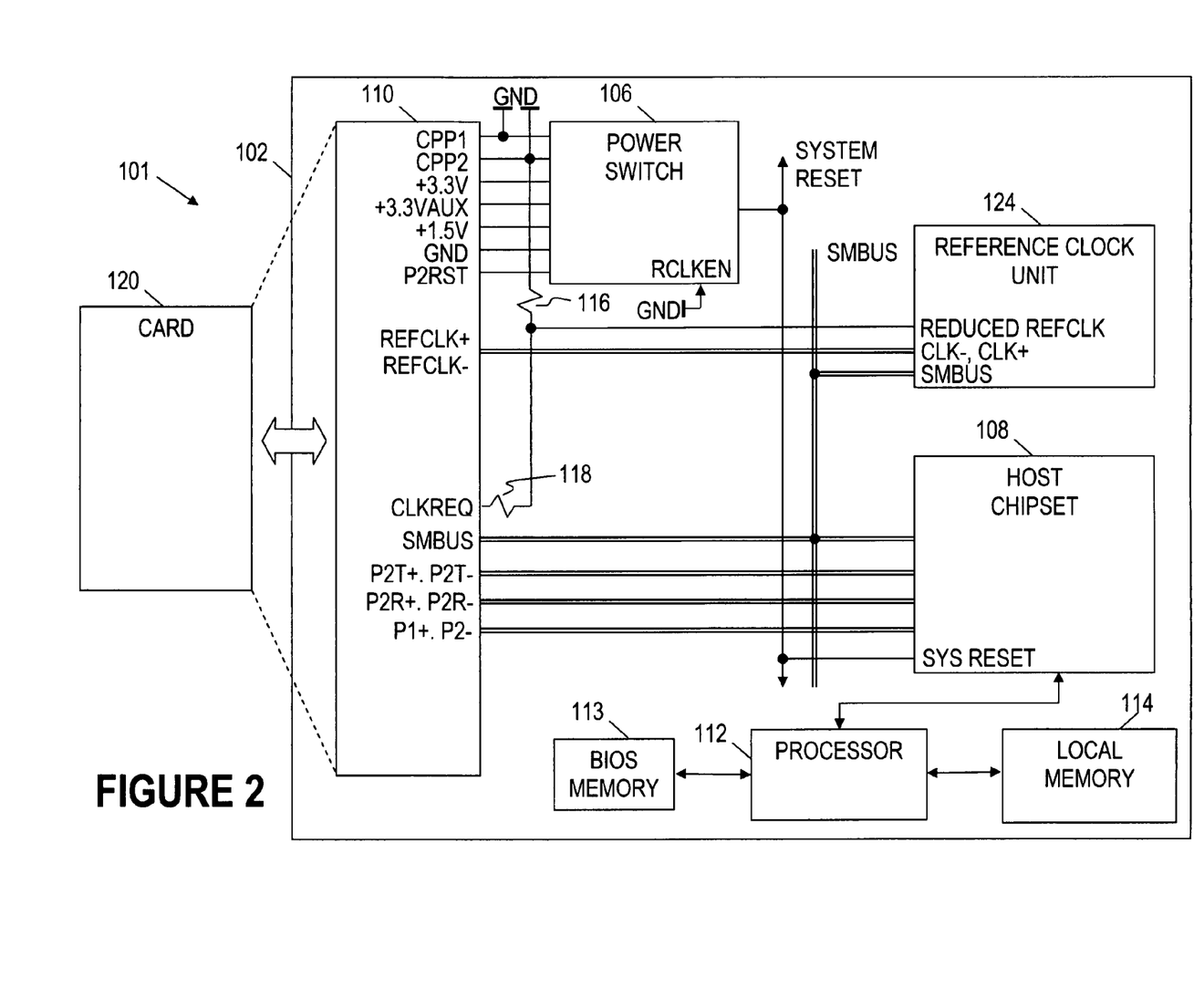
FIG. 2 illustrates a system in accordance with alternative embodiments of the invention.

FIG. 2 illustrates a system 101 in accordance with alternative embodiments of the invention. The system 101 of FIG. 2 is similar to the system 100 of FIG. 1 and enables activation/deactivation of reference clock signals to a hot-pluggable card 120 based on the presence or absence of the card 120. In contrast to the embodiment of FIG. 1, the embodiment of FIG. 2 does not configure GPIs and GPOs of the host chipset 108. Rather, the system 101 reduces the intended (i.e., pre-defined) scalability of a reference clock generator platform (i.e., architecture) in order to enable activation/deactivation of reference clock signals based on the presence or absence of the card 120. The scalability of the reference clock generator platform is reduced to enable simple, dynamic control of when the reference clock signals are activated/deactivated without hardware changes/additions to existing system architecture. In some embodiments, the reference clock signals are compatible with the PCI Express protocol. Thus, in those embodiments, the frequency, rise time, fall time, signal-to-noise ratio (SNR), magnitude or other characteristics of the reference clock signals should correspond to predetermined signal characteristics defined for the PCI Express protocol.

Figure 3:
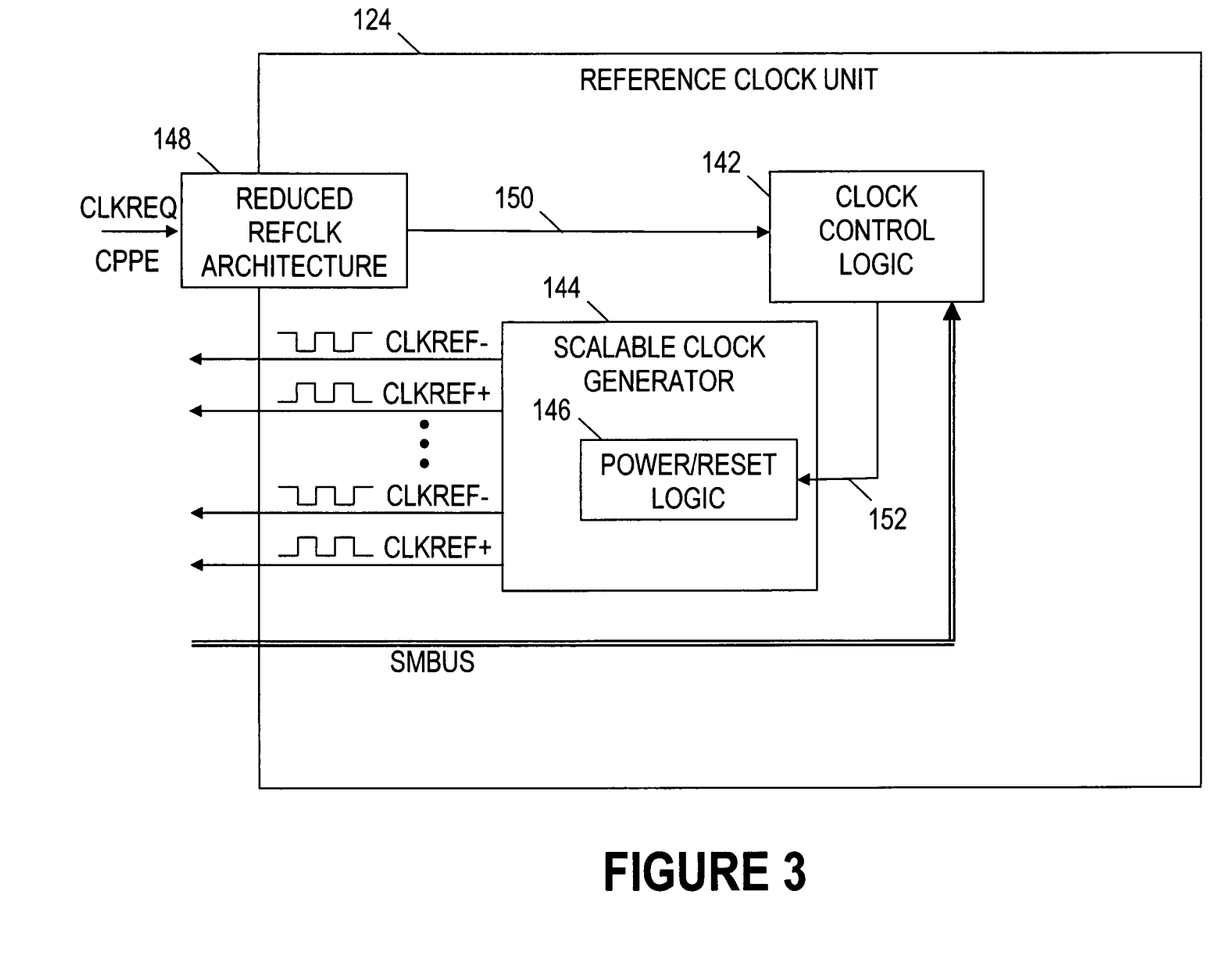
FIG. 3 illustrates a reference clock unit in accordance with embodiments of the invention.

FIG. 3 illustrates an embodiment of the reference clock 124. As shown in FIG. 3, the reference clock 124 comprises clock control logic 142 coupled to a reduced REFCLK architecture 148 and a clock generator 144 configured to output several Serial Reference Clock (SRC) differential signals based on a scalable serial reference clock platform. In some embodiments, the clock control logic 142 may comprise one or more registers and the reduced REFCLK architecture 148 may comprise one or more Serial Reference Clock (SRC) differential output pins. Instead of outputting the differential clock outputs, the pins are used to receive a signal that indicates when a hot-pluggable card is plugged into a system. Therefore, the quantity of predefined reference clock outputs may be reduced by one or more pairs to enable an external signal (e.g., a signal based on presence or absence of a hot-pluggable card) to be received. This enables dynamic activation/deactivation of one or more of the remaining reference clock outputs based on the external signal. As shown, the external signal may be either the CLKREQ signal or the CPP2 signal previously described.

When an asserted CLKREQ signal or CPP2 signal is received by the reduced REFCLK architecture 148 (i.e., when the hot-pluggable card 120 is plugged into the port 110 or requires a clock signal), a signal 150 is forwarded to the clock control logic 142. In response to the asserted signal 150, the clock control logic 142 asserts a signal 152 to power/reset logic 146 of the clock generator 144 whereby one or more pairs of REFCLK+ and REFCLK− signals are activated and output from the clock generator 144.

When either the CLKREQ or CPP2 signals are de-asserted (e.g., when the hot-pluggable card 120 is unplugged from the port 110 or does not require a clock signal), the reduced REFCLK architecture 148 may forward a de-asserted signal 150 to the clock control logic 142. The clock control logic 142 may then de-assert the signal 152 to the power/reset logic 146 of the clock generator 144 whereby the REFCLK+ and REFCLK− signals are deactivated.

Additionally, commands provided via the SMBUS may cause the clock control logic 142 to assert and de-assert the signal 152, thereby activating and de-activating the REFCLK+ and REFCLK− signals. For example, the SMBUS command may be provided when a computer 102 is powered up such that the REFCLK+ and REFCLK− signals are activated without consideration of the external signal. Therefore, while operation of the reference clock unit 124 may be based on an external signal, the reference clock unit 124 is also configurable to output SRC clock signals based on commands from the host chipset 108.

Figure 4:
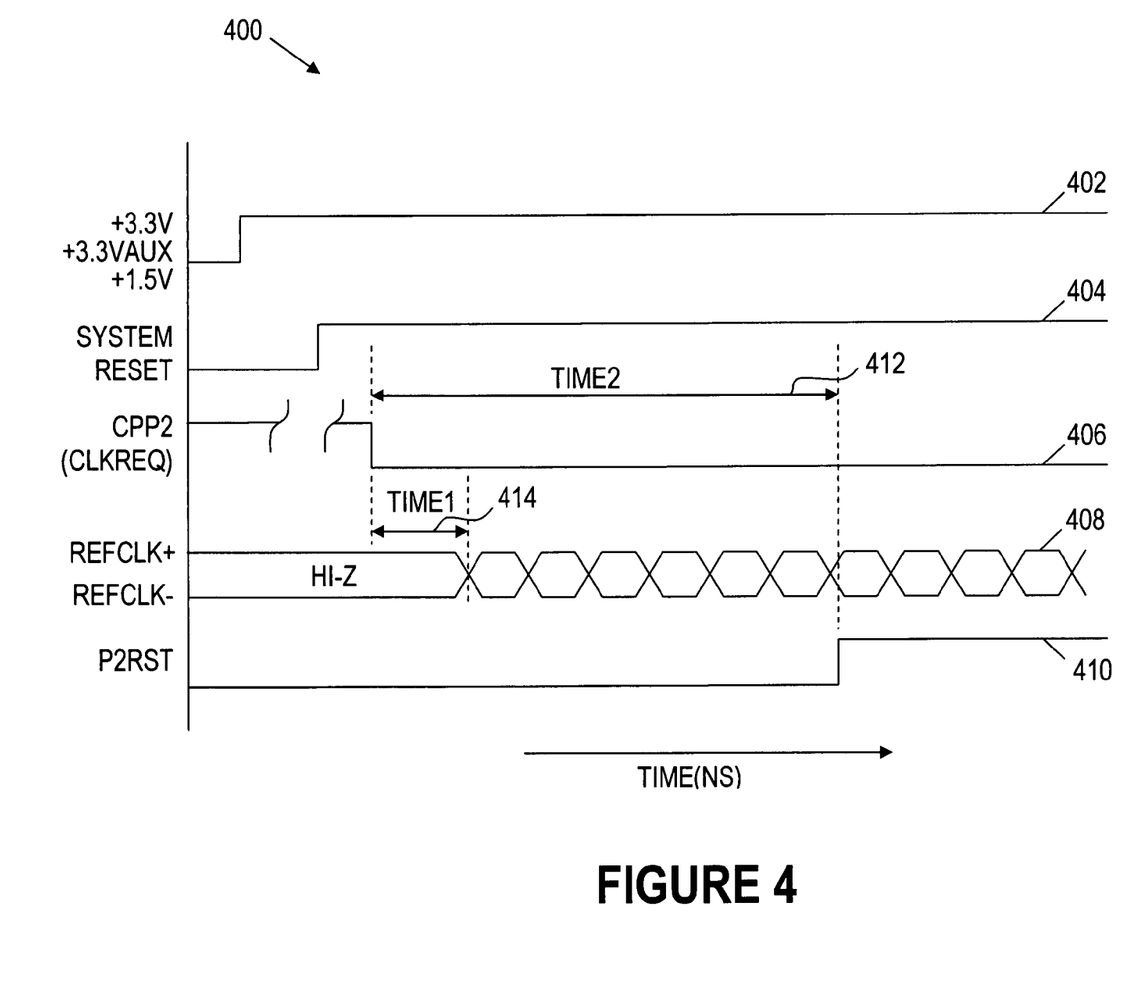
FIG. 4 illustrates a timing diagram in accordance with embodiments of the invention.

FIG. 4 illustrates a timing diagram 400 in accordance with embodiments of the invention. The timing diagram 400 may be representative of the embodiment of FIG. 1. As shown in FIG. 4, the power signals 402 (e.g., the +3.3V, +3.3 VAUX, and +1.5V signals) and a system reset signal 404 are first asserted. For example, the power signals 402 and the system reset signal 404 may be asserted when a computer 102 is powered up. Some time after the signals 402 and 404 are asserted, the CPP2 signal 406 (or CLKREQ signal) is de-asserted (e.g., in some embodiments a "low" signal indicates when a hot-pluggable card 120 is plugged into the port 110). A predetermined time period "TIME1" (e.g., 15 ns) after the CPP2 signal 406 is de-asserted, the REFCLK+ and REFCLK− clock signals 408 are activated. The P2RST signal 410 described above is then asserted after a time period "TIME2." The time period T2 allows the REFCLK+ and REFCLK− signals 408 time to stabilize. When the P2RST signal 410 is asserted, the hot-pluggable card 120 begins to operate, thereby providing a predetermined function to a computer (e.g., the computer 102).

Figure 5:
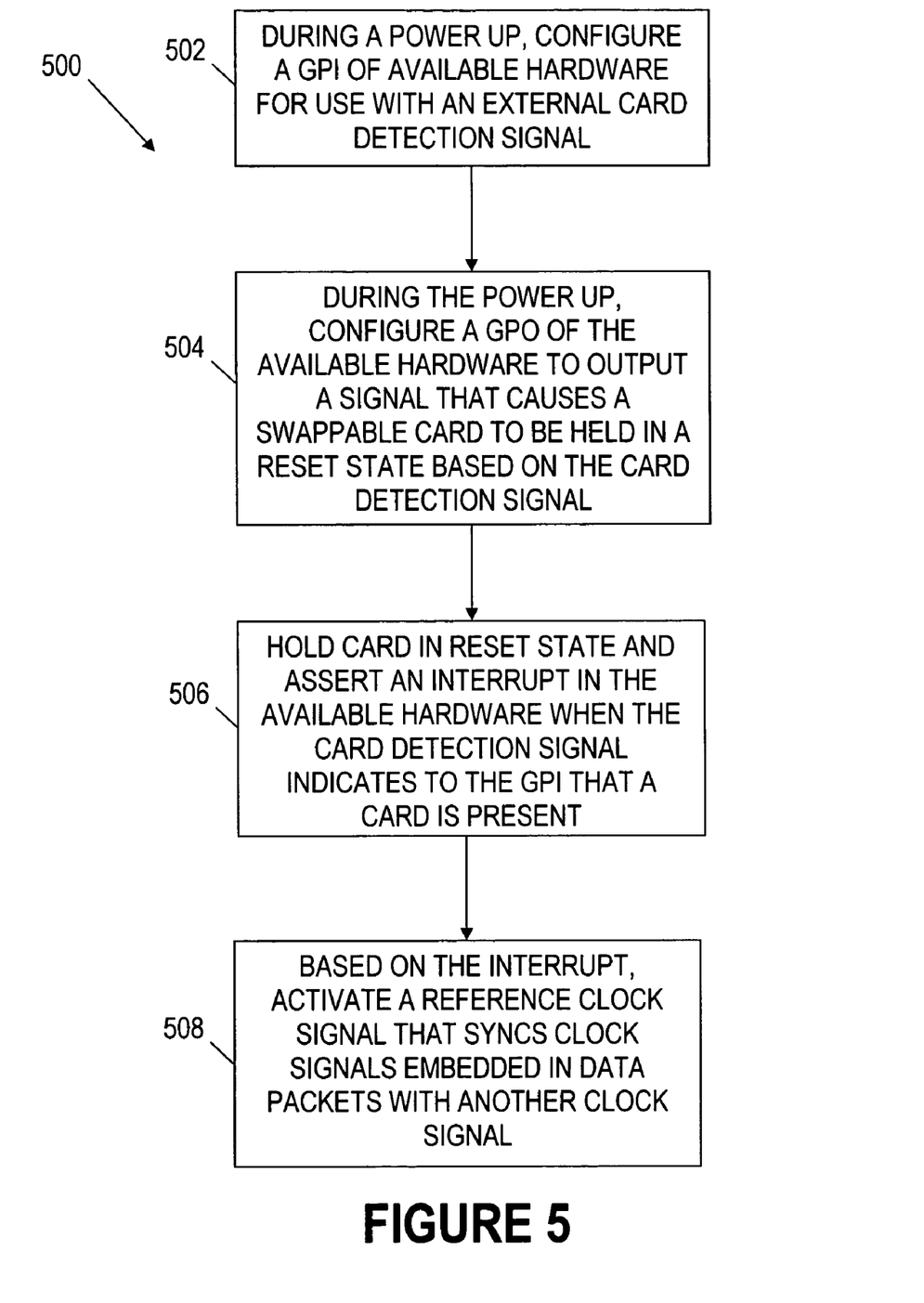
FIG. 5 illustrates a method in accordance with embodiments of the invention.

FIG. 5 illustrates a method 500 in accordance with embodiments of the invention. As shown in FIG. 5, the method 500 comprises configuring, during a system power up, a GPI of available hardware for use with an external card detection signal (block 502). As described above, the external card detection signal may be a CPP2 signal or a CLKREQ signal. The method 500 further comprises configuring, during the system power up, a GPO of the available hardware to output a signal that holds the card in a reset state based on the card detection signal (block 504). The available hardware may comprise a host chipset having GPIs and GPOs or other available hardware. When the external card detection signal indicates that a card is present, the card is held in a reset state and an interrupt (e.g., a host chipset interrupt) is asserted in the available hardware (block 506). Based on the interrupt, a reference clock signal that synchronizes clock signals embedded in data packets with another clock signal is activated (block 508).

Figure 6:
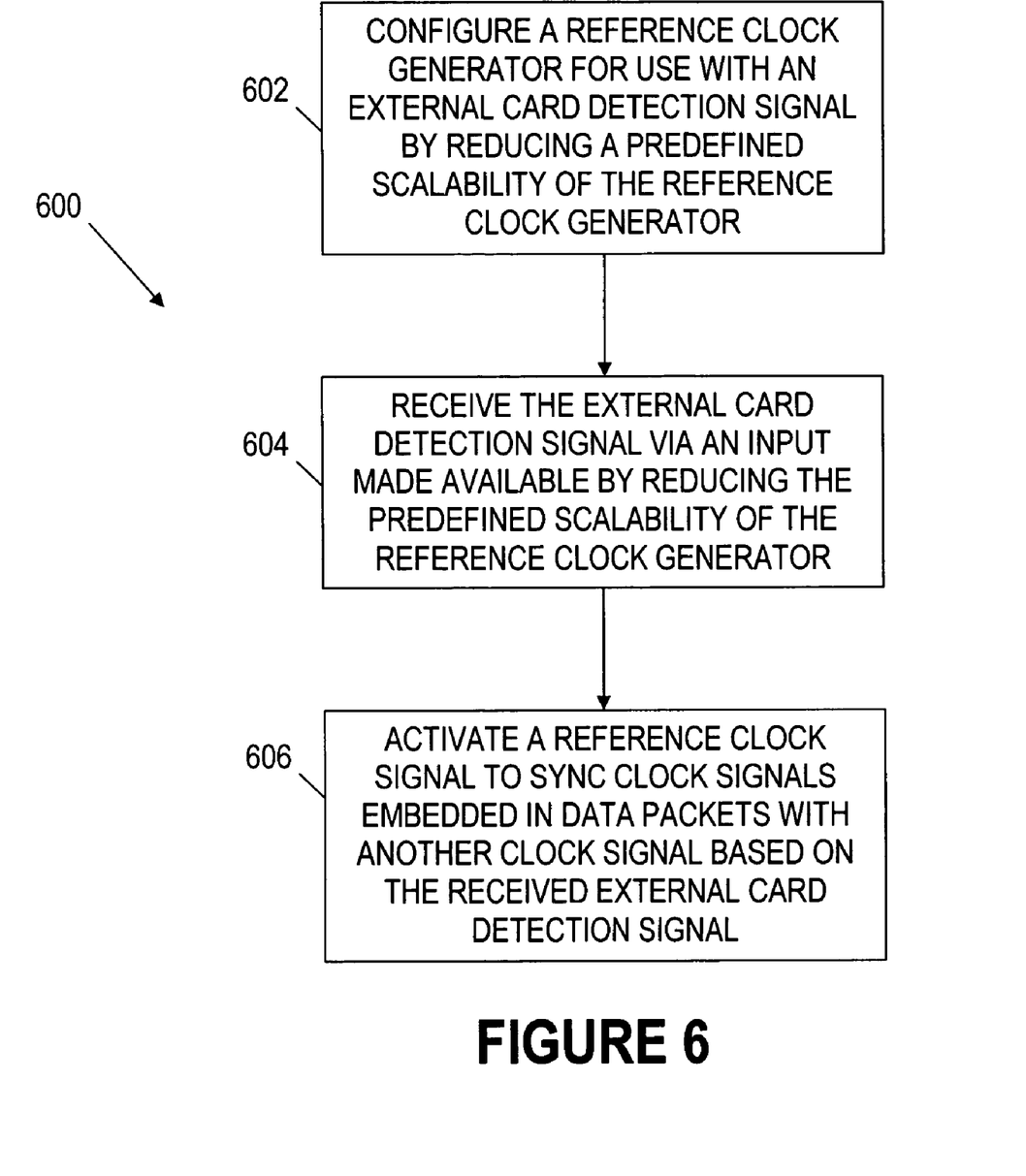
FIG. 6 illustrates a method in accordance with alternative embodiments of the invention.

FIG. 6 illustrates a method 600 in accordance with alternative embodiments of the invention. As shown in FIG. 6, the method 600 comprises configuring a reference clock unit for use with an external card detection signal by reducing an intended (predefined) scalability of the reference clock unit (block 602). For example, a reference clock unit for use with PCI Express may reduce predefined scalability from seven pairs of differential clock outputs to six pairs of differential clock outputs. The method 600 further comprises receiving the external card detection signal via an input made available by the reduction of the unit's predefined scalability (block 604). At block 606, a reference clock signal is activated to synchronize clock signals embedded in data packets with another clock signal based on the received external card detection signal.

The above discussion is meant to be illustrative of the principles and various embodiments of the present invention. Numerous variations and modifications will become apparent to those skilled in the art once the above disclosure is fully appreciated. For example, embodiments of the invention may implement other software, hardware, or a combination thereof to activate/deactivate a reference clock signal based on the presence or absence of a hot-pluggable card. It is intended that the following claims be interpreted to embrace all such variations and modifications.

What is claimed is:

1. A method, comprising:
receiving an external card detection signal that indicates that a hot-pluggable card is coupled to a computer system;
activating at least one reference clock signal of a scalable reference clock platform based on the external card detection signal; and
synchronizing clock signals embedded in data packets transmitted between the hot-pluggable card and the computer system with another clock signal based on the at least one reference clock signal,
wherein receiving the external card detection signal involves one of reducing availability of a reference clock signal and reducing availability of a programmable chipset input.

2. The method of claim 1 further comprising reducing an intended scalability of the reference clock platform.

3. The method of claim 2 wherein receiving the external card detection signal comprises receiving the external card detection signal via an input made available by the reduction of the intended scalability.

4. The method of claim 1 wherein activating at least one reference clock signal of a scalable reference clock platform comprises programming an interrupt routine compatible with existing hardware architecture of a system that implements the scalable reference clock platform.

5. The method of claim 4 further comprising configuring a programmable input of the existing hardware architecture, during a power up of the system, for use with the external card detection signal.

6. The method of claim 4 further comprising configuring a programmable output of the existing hardware architecture, during a power up of the system, to output a reset signal based on the external card detection signal, wherein the reset signal causes the hot-pluggable card to be held in a reset state.

7. A method, comprising:
configuring a reference clock unit for use with an external card detection signal by reducing a predetermined scalability associated with a reference clock architecture associated with the reference clock unit; and
configuring the reference clock unit to activate a reference clock signal output based on the external card detection signal.

8. The method of claim 7 further comprising using the activated reference clock signal to synchronize clock signals embedded in data packets with another clock signal.

9. The method of claim 7 further comprising receiving the external card detection signal, by the reference clock unit, via an input made available by the reduction of the predetermined scalability.

10. A system, comprising:
a processor;
a chipset coupled to the processor; and
a reference clock unit coupled to the chipset and configured to output a scalable number of reference clock signals for synchronizing clock signals embedded in data packets with another clock signal,
wherein the reference clock unit is configured to activate at least one of the reference clock signals based on an external card detection signal that is received by one of a programmable chipset input and the reference clock unit, said external card detection signal identifying when an external card is coupled the system.

11. The system of claim 10 wherein a scalability of the reference clock unit is reduced from a predefined scalability of a reference clock architecture associated with the reference clock unit.

12. The system of claim 11 wherein the predefined scalability comprises seven pairs of differential reference clock outputs.

13. The system of claim 10 wherein the chipset is configured to execute an interrupt routine based on said external card detection signal.

14. The system of claim 13 wherein the interrupt routine is handled as one of a system management interrupt and an advanced configuration and power interface (ACPI) process.

15. The system of claim 13 further comprising a system management bus, wherein the interrupt routine comprises transmitting a write command via the system management bus to the reference clock unit.

16. The system of claim 10 wherein the reference clock unit is compatible with a PCI Express protocol.

17. The system of claim 10 further comprising a port coupled to the reference clock, the port permits the external card to couple to the system.

18. The system of claim 10 wherein a programmable input of the chipset is configured, during a power up of the system, to receive the external card detection signal.

19. A reference clock unit, comprising:
a clock generator configured to output a scalable number of reference clock signals, wherein the scalable number of reference clock signals is reduced from a predetermined maximum number of reference clock signals associated with the reference clock unit's platform in order to receive an external card detection signal; and
clock control logic configured to assert an activation signal that causes the clock generator to activate at least one of the reference clock signals based on an external card detection signal.

20. The reference clock unit of claim 19 wherein the reference clock signals are compatible with the PCI Express protocol.

21. The reference clock unit of claim 19 wherein the scalable number of reference clock signals consists of six pairs of differential reference clock outputs and wherein the predetermined maximum number of reference clock signals consists of seven pairs of differential reference clock outputs.

22. The reference clock unit of claim 19 wherein the clock control logic comprises at least one register.

23. The reference clock unit of claim 19 wherein the clock control logic is configured to activate at least one of the reference clock signals based on write commands received via a system management bus.

24. The reference clock unit of claim 19 wherein the clock control logic is configured to activate at least one of the reference clock signal based on an external card detection signal.

25. The reference clock unit of claim 24 wherein the external card detection signal is received via an input made available by reducing a predetermined scalability associated with the reference clock unit's platform.

* * * * *

UNITED STATES PATENT AND TRADEMARK OFFICE
CERTIFICATE OF CORRECTION

PATENT NO.        : 7,457,904 B2
APPLICATION NO.   : 11/014409
DATED             : November 25, 2008
INVENTOR(S)       : Richard S. Lin et al.

It is certified that error appears in the above-identified patent and that said Letters Patent is hereby corrected as shown below:

On the title page, item (57), under "Abstract", in column 2, line 9, delete "bases" and insert -- based --, therefor.

In column 8, line 47, in Claim 10, after "coupled" insert -- to --.

In column 9, line 17, in Claim 19, after "on" delete "an" and insert -- the --, therefor.

Signed and Sealed this

Twelfth Day of May, 2009

JOHN DOLL
*Acting Director of the United States Patent and Trademark Office*